United States Patent [19]

Lasoen

[11] Patent Number: 5,421,790
[45] Date of Patent: Jun. 6, 1995

[54] CONTINUOUSLY VARIABLE TRANSMISSION

[75] Inventor: Jean-Jacques Lasoen, Villepreux, France

[73] Assignee: Massey-Ferguson S.A., France

[21] Appl. No.: 81,395

[22] Filed: Jun. 22, 1993

[30] Foreign Application Priority Data

Jun. 27, 1992 [GB] United Kingdom ................ 9213703

[51] Int. Cl.$^6$ ............................................. F16H 47/04
[52] U.S. Cl. ............................................. 475/78; 475/80
[58] Field of Search ........................... 475/72, 78, 80

[56] References Cited

U.S. PATENT DOCUMENTS

| | | |
|---|---|---|
| 3,580,107 | 5/1971 | Orshansky, Jr. . |
| 3,888,139 | 6/1975 | Orshansky, Jr. . |
| 4,563,914 | 1/1986 | Miller ................................. 475/80 |
| 5,011,463 | 4/1991 | Jarchow et al. ..................... 475/78 |

FOREIGN PATENT DOCUMENTS

| | | |
|---|---|---|
| 0101358 | 2/1984 | European Pat. Off. . |
| 0365772 | 5/1990 | European Pat. Off. . |
| 0464413 | 1/1992 | European Pat. Off. . |
| 1113621 | 9/1961 | Germany . |
| 2820025 | 11/1979 | Germany . |
| 3344042 | 6/1985 | Germany . |
| 1250990 | 10/1971 | United Kingdom . |

Primary Examiner—Edward K. Look
Assistant Examiner—Christopher Verdier
Attorney, Agent, or Firm—MacMillan, Sobanski & Todd

[57] ABSTRACT

A continuously variable transmission includes an input shaft, an output shaft, and first and second epicyclic gear trains, each with an input member, an output member and a reaction member. An hydrostatic shunt loop including first and second hydraulically interconnected variable displacement hydraulic units interconnects the two epicyclic gear trains. The input members of both epicyclic gear trains are driven from the input shaft, and the output members of both epicyclic gear trains drive the output shaft. First and second drive trains are provided for alternatively coupling the first variable displacement hydraulic unit respectively to either the input shaft or the reaction member of the first epicyclic gear train. Third and fourth drive trains are provided for alternatively coupling the second variable displacement hydraulic unit respectively to either the output shaft or the reaction member of the second epicyclic gear train. A transmission control system is provided for selective operation of the first, second, third, and fourth gear trains to operate the transmission in three modes. In the first mode, the second and third gear trains are operational to utilize the first epicyclic only with its reaction member connected to the output shaft via the hydrostatic shunt loop. In the second mode, the second and fourth gear trains are operational to utilize both epicyclics with their reaction members interconnected via the hydrostatic shunt loop. Finally, in the third mode, the first and fourth gear trains are operational to utilize the second epicyclic only with its reaction member connected to the input shaft via the hydrostatic shunt loop.

8 Claims, 3 Drawing Sheets

CONTINUOUSLY VARIABLE TRANSMISSION

This invention relates transmissions and in particular to continuously variable transmissions (CVTs) in which the output ratio of the transmission is variable in a continuous manner between the end limits of its total range.

BACKGROUND OF THE INVENTION

It is an object of the present invention to provide a CVT with a wide overall operating range which is suitable for use in an agricultural or industrial tractor.

SUMMARY OF THE INVENTION

Thus according to the present invention there is provided a CVT having an input shaft and an output shaft, first and second epicyclic gear trains each with an input member, an output member and a reaction member, and an hydrostatic shunt loop comprising first and second hydraulically interconnected variable displacement hydraulic units, the input members of both epicyclic gear trains being driven from the input shaft and the output members of both epicyclic gear trains driving the output shaft, first and second drive trains for alternatively coupling the first variable displacement hydraulic unit respectively to either the input shaft or the reaction member of the first epicyclic gear train, third and fourth drive trains for alternatively coupling the second variable displacement hydraulic unit respectively to either the output shaft or the reaction member of the second epicyclic gear train, and a transmission control system for selective operation of the first, second, third and fourth gear trains to operate the transmission in three modes, as follows:

a) with the second and third gear trains operational to utilise the first epicyclic only with its reaction member connected to the output shaft via the hydrostatic shunt loop;

b) with the second and fourth gear trains operational to utilise both epicyclics with their reaction members interconnected via the hydrostatic shunt loop, and c) with the first and fourth gear trains operational to utilise the second epicyclics only with its reaction member connected to the input shaft via the hydrostatic shunt loop.

In a preferred arrangement, one epicyclic gear train is coaxial with the input shaft and the other is coaxial with the output shaft and a further output gear train is provided with shafts coaxial with the input and output shafts to extend the overall range of the transmission.

The output gear train may also include a reverse drive gear train.

The first and second epicyclic gear trains may have identically sized sun, planet and annulus gears.

BRIEF DESCRIPTION OF THE DRAWINGS

One embodiment of the present invention, as applied to a tractor transmission, will now be described, by way of example only, with reference to the accompanying drawings in which:

FIG. 4 is a tabular summary of the operation of the solenoid-operated valves and piston position sensors when in and changing between the modes of the CVT.

DETAILED DESCRIPTION OF THE PREFERRED EMBODIMENTS

Figure 1:
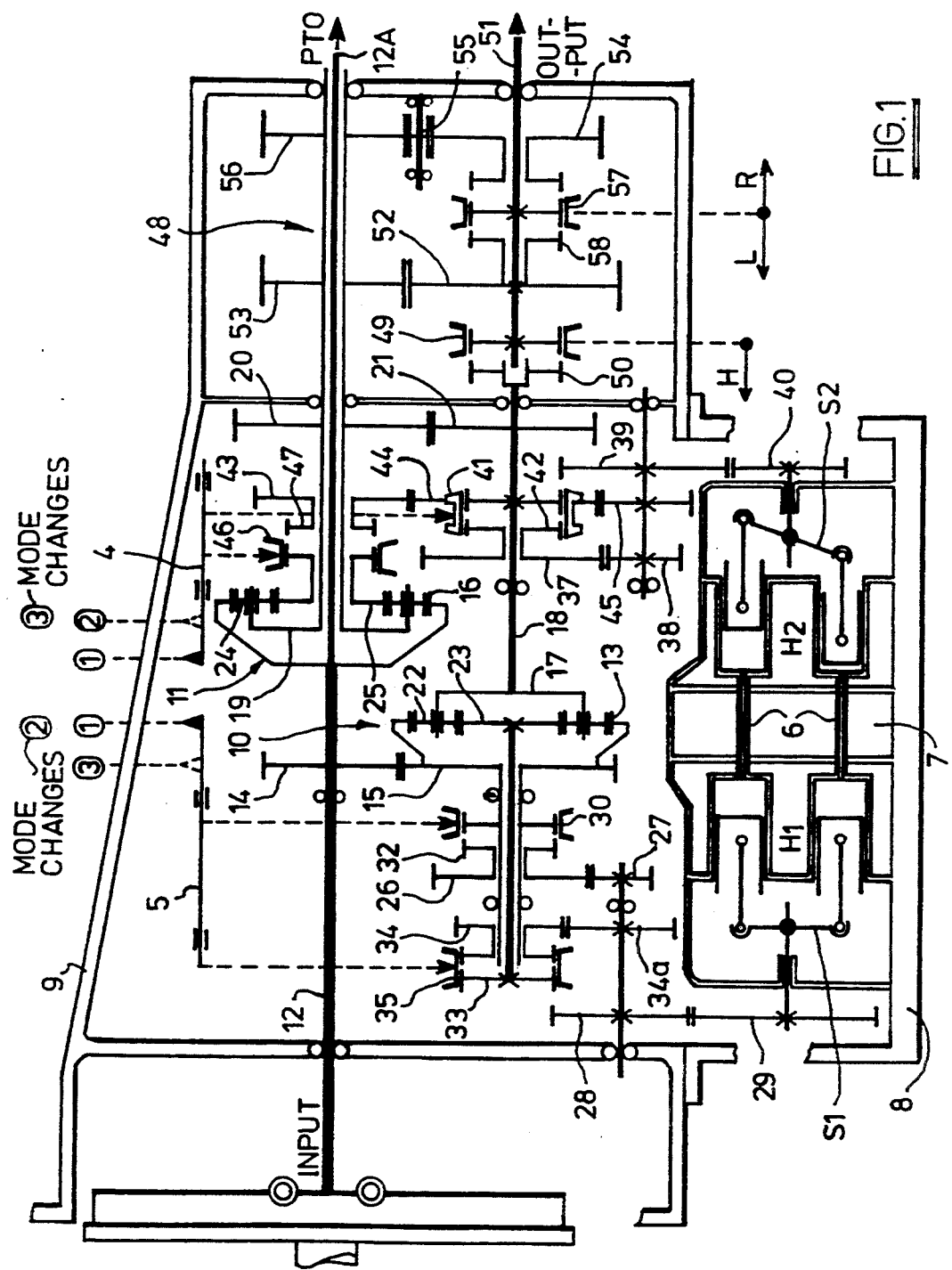
FIG. 1 is a diagrammatic section through a CVT embodying the present invention.

Referring to FIG. 1, this shows a CVT in accordance with the present invention which is particularly suitable for tractor applications and which includes first and second epicyclic gear trains 10 and 11 and first and second variable displacement hydraulic units H1 and H2 which are hydraulically interconnected via passages 6 in a connecting block 7 and which constitute an hydrostatic shunt loop. Typically these units are of the variable swash-plate type, their swash plates being diagrammatically shown at S1 and S2 respectively. The use of the connecting block 7 ensures minimum pressure drop between H1 and H2. An input shaft 12 drives the annulus gear 13 of first epicyclic gear train 10 via gears 14 and 15 and also directly drives the annulus gear 16 of the second epicyclic gear train 11. The planet carrier 17 of the epicyclic gear 10 is connected to an output shaft 18 and similarly the planet carrier 19 of epicyclic gear 11 is also connected to output shaft 18 via gears 20 and 21.

Planet gears 22 carried by carrier 17 mesh with a sun gear 23 which operates as the reaction member of epicyclic gear train 10. Similarly planet gears 24 of epicyclic gear 11 mesh with sun gear 25 which acts as the reaction member of epicyclic gear 11.

In the arrangement disclosed, the epicyclic gear trains 10 and 11 have identically sized sun, planet and annulus gears thus significantly reducing production costs.

A first drive train constituted by gears 26, 27, 28 and 29 is provided for coupling the hydraulic unit H1 to the input shaft 12 via a first coupler 30 and gears 14 and 15. As will be appreciated, the first gear train is activated by displacing the coupler 30 to the left from the position shown in FIG. 1 so that the coupler 30 engages clutch teeth 32. A second drive train in the form of gears 34, 34a, 28 and 29 is provided to connect the sun gear 23 of epicyclic gear train 10 to the hydraulic unit H1. This train is activated when a second coupler 35 is in the position shown in FIG. 1 in which clutch teeth 33 are engaged.

As shown diagrammatically in FIG. 1, the two couplers 30 and 35 are moved between their two positions by a single shift rail 5 which is actuated by a double acting hydraulic piston and cylinder assembly 101 (see FIG. 3) under the control of solenoid operated valves EV2, EV3. When coupler 30 is engaged, coupler 35 is disengaged and vice versa.

A third gear train is provided in the form of gears 37, 38 39 and 40 for connecting the hydraulic unit H2 with the output shaft 18 when a third coupler 41 engages clutch teeth 42 as shown in FIG. 1.

A fourth gear train in the form of gears 43, 44, 45, 39 and 40 connects the hydraulic unit H2 with the sun gear 25 of epicyclic gear train 11 when a fourth coupler 46 is moved to the right from the position shown in FIG. 1 to engage the clutch teeth 47. The couplers 41 and 46 are moved between their two positions by a further shift rail 4 which is actuated by another double acting hydraulic piston and cylinder assembly 100 under the control of solenoid operated valves EV1, EV2 (see FIG. 3).

Figure 3:
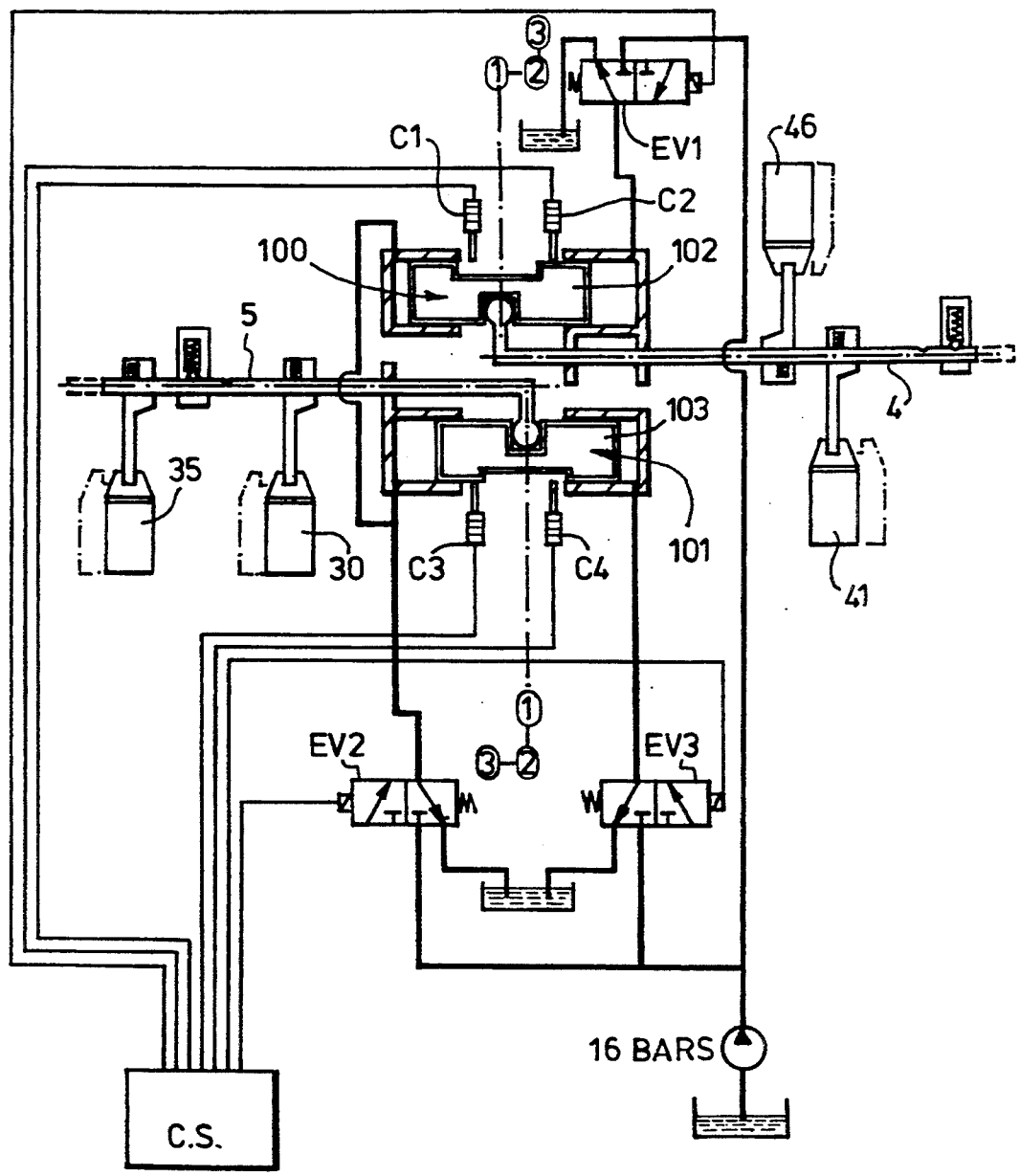
FIG. 3 is a diagrammatic representation of a suitable hydraulic circuit for changing the modes of the CVT.

FIG. 3 shows the hydraulic circuit used for moving the shift rails 4 and 5 using double-acting piston and cylinder assemblies 100 and 101 and solenoid-operated valves EV1, EV2 and EV3. The axial positions of the pistons 102 and 103 within their respective cylinders are detected by four sensors C1–C4. Sensors C1–C4 and valves EV1, EV2 and EV3 are connected to an electronic control system indicated diagrammatically at CS in FIG. 3.

FIG. 4 shows in tabular form the solenoid-operated valve which must be activated to change between the three operating modes of the CVT (as will be described below) and also the signals given by the sensors C1–C4 when in each of the modes. As can be seen from FIG. 4 when the transmission is in each of the modes the cylinders 100 and 101 are not pressurised and the shift rails are held in the required position by shift rail detents. It will also be evident from FIG. 4 that the hydraulic circuit is binary in operation, that is in order to change between adjacent modes of the CVT it is only necessary to actuate a single solenoid-operated valve EV1, EV2 or EV3. The valves EV1–EV3, the sensors C1–C4 and the double-acting cylinders 100 and 101 are all mounted on a removable side-cover of the transmission housing to provide easy serviceability and access.

The CVT also includes an output gear train 48 which provides a low range, a high range and a reverse drive range thus extending the total overall ratio range of the transmission. The output gear train 48 includes a coupler 49 which, when moved to the left from the position shown in FIG. 1, engages clutch teeth 50 to couple final output shaft 51 with output shaft 18 and provide the high range of the output gear train. Two other gear trains 52, 53 and 54, 55, 56 are provided which can be selectively engaged by operation of a further coupler 57. With coupler 49 disengaged as shown in FIG. 1 and coupler 57 moved to the left from the position shown in FIG. 1, gear train 52, 53 is engaged via clutch teeth 58 and drive is transmitted from output shaft 18 via gears 21, 20, 53, 52 to the final output shaft 51 to provide the low range of the output gear train. If coupler 49 is disengaged as shown at FIG. 1 and coupler 57 is moved to the right, gear train 54, 55, 56 is then connected to provide drive from output shaft 18 via gears 21, 20, 56, 55, 54 on to the final output shaft 51 in its reverse range due to the provision of the reverse idler 55 between gears 56 and 54.

Thus, as will be appreciated, by use of the output gear train 48, the total overall forward ratio of the CVT is doubled and a reverse drive capability is also provided.

Also, input shaft 12 travels longitudinally through the transmission to emerge at location 12A. This shaft can be used to provide a power-take-off (PTO) facility for the tractor.

The transmission arrangement described is particularly compact and fits into a standard existing tractor transmission housing 9 with the addition of a removable dished plate 8 which slightly increases the internal size of the housing and also provides easy access to the hydraulic units and the remainder of the transmission. The hydraulic units may be bolted to the inside of the plate 8 for ease of removal and thus optimum serviceability. The aperture in the housing which the plate 8 covers is also used for transmission assembly.

It will be appreciated that the couplers 30, 35, 41 and 46 described above are preferably of the synchromesh type.

Operation of the CVT will now be described with reference to FIG. 2, which shows the relative percentage of the total power transmitted mechanically and hydraulically throughout all the operating modes of the transmission.

In order to move the tractor away from rest, the low ratio of the output gear train 48 is selected by the control system CS of the CVT by moving coupler 57 to the left as viewed in FIG. 1 and the control system of the CVT engages the couplers 35 and 41 as shown in FIG. 1 in order to connect the sun gear 23 of planetary gear train 10 with the output shaft 18, so that the transmission is running in its first mode, the so-called output coupled condition with the double-acting cylinders 100–101 in the positions shown in FIG. 3. In this mode the hydraulic unit H2 acts as a motor with its swash plate S2 set to give the maximum volumetric displacement condition, as shown in FIG. 1, and the hydraulic unit H1 acts as a pump with its swash plate S1 set to give a nil flow rate. In this condition the pressure in the hydraulic circuit interconnecting units H1 and H2 is dictated by the torque acting on the output shaft 18.

To move away from rest the setting of swash plate S1 is progressively changed by the control system to begin the build-up of pumping pressure in unit H1 to overcome the torque on the output shaft 18. Unit H2 then starts to rotate and to drive the output shaft under a maximum torque defined by the pressure setting of an hydraulic relief valve (not shown) in the connection between units H1 and H2.

The torque needed to drive the pump H1 increases as the setting of swash plate S1 is changed to increase its volumetric displacement. As a consequence, additional torque is transmitted to output shaft 18 through the output member 17 of epicyclic gear train 10. In addition, the speed of the unit H2 and the output shaft 18 increases as the volumetric displacement of H1 increases and the transmitted power increases along portion OP of the curve shown in FIG. 2.

Figure 2:
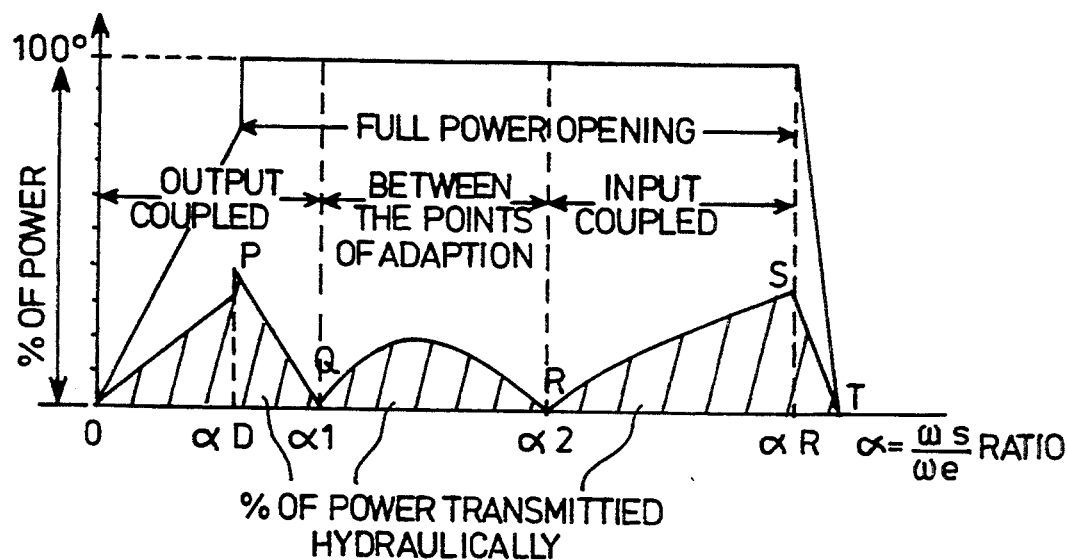
FIG. 2 is a graphical representation of the proportion of the total power available transmitted mechanically and hydraulically throughout the entire operating range of the CVT.

When unit H1 achieves its maximum volumetric displacement, the maximum power is transmitted to the output shaft and this corresponds to point P in FIG. 2. A small part of this power is transmitted through the hydraulic shunt loop provided by Unit H1 and H2. The ratio obtained at this point P is $\alpha D$, as shown in FIG. 2.

The range from rest ($\alpha = 0$) to $\alpha D$ is a starting range and the tractor can move away from rest without any loss of energy as long as the torque on the output shaft at rest does not give rise to a shunt loop hydraulic pressure which exceeds the relief pressure setting of the hydraulic relief valve in the connection between units H1 and H2.

If the resisting torque on the output shaft gives rise to a pressure which is higher than the relief valve setting, the relief valve will open resulting in a loss of energy but since the torque of unit H1 increases with the volumetric displacement so the torque transmitted to the output shaft will nevertheless increase up to the maximum torque available at ratio $\alpha D$ at point P.

To increase the output speed above $\alpha D$ along portion PQ of the curve, the setting of swash plate S1 is progressively changed by the control system to reduce the volumetric displacement of hydraulic unit H2. This increases the speed of unit H2 and the output shaft 18 up to a ratio $\alpha 1$ at point Q. At point Q the volumetric displacement of motor H2 is nil and hence pump H1 is hydraulically locked and all the power is transmitted mechanically from the input shaft 12 to the output shaft 18 through the epicyclic gear train 10 which has its sun gear 23 held stationary by the locked unit H1. Point Q gives a ratio α1 with the hydraulic unit H2 running at its maximum speed but without the transmission of torque.

At point Q the control system actuates valve EV2 which pressurises the left-hand end of piston 103 which is already displaced fully to the right and also pressurises the left-hand end of piston 102 which moves piston 102 to the right. This moves shift rail 4 to disengage coupler 41 from clutch teeth 42 thus disengaging gear 37 from output shaft 18 fractionally before engaging coupler 46 with clutch teeth 47 to couple the gear 43 with the reaction member (the sun 25) of the epicyclic gear train 11. The tooth numbers of the gears 43, 44, 45, 37, 38, 39, 40 are chosen in order that gears 25 and 43 rotate at the same speed at point Q to enable coupler 46 to be moved quickly in order to obtain a smooth continuity of ratio variation.

After this change at point Q, the transmission is operating in its second mode in which the reaction members (the suns 23, 25) of the epicyclic gear trains 10 and 11 are interconnected via the shunt loop. In this mode unit H1 is still connected to the epicyclic gear train 10 but now works as an hydraulic motor and the unit H2 is connected with the epicyclic train 11 and now works as an hydraulic pump. The change from mode two to mode one is made (as can be seen from FIG. 4) by actuating valve EV1 which pressurises the right-hand end of piston 102 to move this piston to the left to the position showed in FIG. 3.

The overall output ratio of the transmission can then be varied from α1 to α2 along portion QR of the curve shown in FIG. 2 by varying the swash plate angles of the hydraulic units H1 and H2.

At output ratio α2 which corresponds to point R on the curve of FIG. 2, the hydraulic unit H1 is in a zero volumetric displacement condition so that the unit H2 is hydraulically locked thus holding the sun 25 of epicyclic gear train 11 locked. The gear trains driving the couplers 35 and 30 are arranged to be such that at the point R the couplers rotate at the same speed. This allows the control system to actuate valve EV3 which pressurises the right-hand end of piston 103 to move piston 103 to the left, as viewed in FIG. 3. This in turn moves shift rail 5 to engage coupler 30 with clutch teeth 32 fractionally before coupler 35 is disengaged from clutch teeth 33 so that the sun gear 25 of epicyclic gear train 11 is now driven from the input shaft 12 via the hydraulic units H1 and H2 and the CVT is operating in its third mode. The swash plate of hydraulic unit H1 is opened by the control system CS to begin to drive H2 which in turn begins to drive the sun gear 25 of epicyclic 11 so that the speed of planet carrier 19 increases, thus increasing the overall output ratio of the transmission up to ratio αR at point S in FIG. 2.

The change in the opposite direction from mode three to mode two of the CVT can also be made at point R by actuating valve EV2 which pressurises the left-hand end of both pistons 102 and 103. Since piston 102 is already displaced to the right this has no effect on piston 102 but piston 103 is displaced to the right to move shift rail 5.

The portion S to T of the curve of FIG. 2 represents the regulator slope on the torque/speed characteristic of the engine between the maximum power point and the no-load maximum engine speed condition.

As described above, the control system CS of the CVT ensures that whenever the tractor starts from rest the output gear train 48 is in its low range. The system then controls the swash plate angles and the couplers, as described above, in order to shift the overall range of the transmission from zero to αR, as described above.

When the output ratio αR is achieved at point S, the control system CS automatically changes to the high range of the output gear train 48, as follows.

Firstly, the control system CS releases the pressure in the hydraulic shunt loop via an electrically operated check valve (not shown) in the connection between units H1 and H2. The system then places the range change coupler 57 in its neutral position so that neither gear train 52, 53 nor train 54, 55, 56 is coupled to the output shaft 51. The mode and overall output ratio of the CVT is then adjusted in order to minimise the speed differential between output shaft 51 and the high range clutch teeth 50 carried on shaft 18. The coupler 49 is then moved by an electro-hydraulic actuating system (not shown) to engage clutch teeth 50 to connect the high range of the output gear train. This is possible because there is a large overlap between the low and high ranges.

The low to high range change procedure described above produces a very fast change without any jerk and requires no action on the part of the tractor operator, who simply moves a single control lever along a straight gate from a zero speed position up to a maximum speed position, whereupon the control system CS makes the necessary mode and range changes to achieve the speed selected by the operator.

The forward/reverse drive direction is selected by the tractor operator moving a separate control lever, mounted on the steering column, into either a forward or reverse drive direction selection position.

If the tractor is moving in the forward direction and reverse is selected by the operator, the control system reduces the speed of the tractor by changing the modes and, if necessary, the ranges of the CVT to bring the tractor to rest using the maximum engine braking effect without exceeding a predetermined limit of deceleration. When the tractor is at rest and the output ratio α of the CVT is zero, the system will move the coupler 57 using an electro-hydraulic actuating system (not shown) to select the reverse drive train 54, 55, 56 and will then increase the setting of hydraulic units H1 and H2 and make the necessary mode changes to achieve the speed in reverse selected by the operator.

As is evident from the above and as can be seen from FIG. 2, the CVT has a region of full power utilisation between αD and αR. Typically, when the CVT is operating with the low range of output gear train 48 engaged, ground speed of 0 to 17 Km/hour can be achieved so that all the normal field working operations can be undertaken in low range.

The high range typically allows ground speeds of 0 to 40 Km/hour and the change between the high and low ranges is typically made at, say, 14 Km/hour without any interruption in the drive capability of the CVT.

The CVT described above, with identical planetary gear trains 10, 11 and two simple gear trains (14, 15 and 20, 21) defining ratios α1 and α2, is very versatile. The variation of speed range is limited by the hydraulic elements for a given engine power. However, a larger range is possible for smaller engine power simply by changing the ratios of the gear trains 14, 15 and 20, 21. In addition, with the output gear train 48 essentially separate from the front variator section, it is simple to adapt the output gear section for any application without altering the variator section. For instance, the output gear train 48 could be used to supply an overdrive ratio in place of the low range and reverse described above.

Also the basic two-shaft layout of the transmission with the second planetary gear train 11 coaxial with the input shaft 12 and PTO shaft 12A and with the first planetary gear train 10 coaxial with the output shaft 51 is allowing the output of the transmission to be taken either at shaft 51 as described or, alternatively, with appropriate internal gearing modifications, coaxial with input/PTO shaft 12/12A. This enables the variator and total transmission to be easily matched to any vehicle kinematic giving great versatility.

Also, as mentioned above, the two shaft layout allows easy use of identically sized sun, planet and annulus gears thus significantly reducing production costs.

What is claimed is:

1. A continuously variable transmission having an input shaft and an output shaft, first and second epicyclic gear trains each with an input member, an output member and a reaction member, and a hydrostatic shunt loop comprising first and second hydraulically interconnected variable displacement hydraulic units interconnecting the two epicyclic gear trains, wherein the input members of both epicyclic gear trains are driven from the input shaft and the output members of both epicyclic gear trains drive the output shaft, first and second drive trains are provided for coupling the first variable displacement hydraulic unit respectively to either the input shaft or the reaction member of the first epicyclic gear train, third and fourth drive trains are provided for coupling the second variable displacement hydraulic unit respectively to either the output shaft or the reaction member of the second epicyclic gear train, and a transmission control system is provided for selective operation of the first, second, third and fourth gear trains to operate the transmission in three modes, as follows:

a) with the second and third gear trains operational to utilise the first epicyclic gear train only with its reaction member connected to the output shaft via the hydrostatic shunt loop;

b) with the second and fourth gear trains operational to utilise both epicyclic gear trains with their reaction members interconnected via the hydrostatic shunt loop; and c) with the first and fourth gear trains operational to utilise the second epicyclic gear train only with its reactive member connected to the input shaft via the hydrostatic shunt loop.

2. A transmission according to claim 1 characterised in that one of said epicyclic gear trains is coaxial with the input shaft and the other of said epicyclic gear trains is coaxial with the output shaft and a further output gear train is provided with shafts coaxial with the input and output shafts to extend the overall range of the transmission.

3. A transmission according to claim 2 characterised in that the output gear train also includes a reverse drive gear train.

4. A transmission according to claim 1 characterised in that the first and second epicyclic gear trains have identically sized sun, planet and annulus gears.

5. A transmission according to claim 1 characterised in that the first and second drive trains are coupled by separate couplers operated by a single shift rail and in that the third and fourth drive trains are coupled by further separate couplers operated by a further single shift rail.

6. A transmission according to claim 5 characterised in that each shift rail is operated by a separate fluid-pressure operated double acting piston and cylinder assembly.

7. A transmission according to claim 6 characterised in that pressure at the ends of the double-acting piston and cylinder assemblies is controlled by solenoid-operated valves to move the associated shift rails.

8. A transmission according to claim 7 characterised in that three two-position solenoid-operated valves are used to control the pressure at the ends of the double acting piston and cylinder assemblies, the valves being interconnected in a fluid circuit which is binary in operation so that changes are made between adjacent ones of said modes of the transmission by activating only an appropriate single one of the valves.

* * * * *